(12) United States Patent
Kemper et al.

(10) Patent No.: US 8,196,384 B2
(45) Date of Patent: Jun. 12, 2012

(54) CHAIN LINK HAVING A MULTI-AXIS LINK JOINT

(75) Inventors: Uwe Kemper, Kreuztal (DE); Heiner Samen, Marienheide (DE)

(73) Assignee: Tsubaki Kabelschlepp GmbH (DE)

( * ) Notice: Subject to any disclaimer, the term of this patent is extended or adjusted under 35 U.S.C. 154(b) by 206 days.

(21) Appl. No.: 12/086,321

(22) PCT Filed: Dec. 22, 2006

(86) PCT No.: PCT/EP2006/012503
§ 371 (c)(1),
(2), (4) Date: Jul. 20, 2009

(87) PCT Pub. No.: WO2007/076986
PCT Pub. Date: Jul. 12, 2007

(65) Prior Publication Data
US 2010/0043383 A1    Feb. 25, 2010

(30) Foreign Application Priority Data
Dec. 23, 2005   (DE) .......................... 10 2005 061 777

(51) Int. Cl.
*F16G 13/16* (2006.01)

(52) U.S. Cl. .......................................... 59/78.1; 248/49

(58) Field of Classification Search ............ 59/78.1, 59/900; 248/49, 51
See application file for complete search history.

(56) References Cited

U.S. PATENT DOCUMENTS

| 4,570,437 A | | 2/1986 | Mortiz | |
|---|---|---|---|---|
| 4,807,432 A | | 2/1989 | Mauri | |
| 5,048,283 A | * | 9/1991 | Moritz et al. | 59/78.1 |
| 6,178,732 B1 | * | 1/2001 | Weber | 59/78.1 |
| 7,310,936 B2 | * | 12/2007 | Saiki et al. | 59/78.1 |
| 7,454,891 B2 | * | 11/2008 | Utaki et al. | 59/78.1 |

FOREIGN PATENT DOCUMENTS

| DE | 297 21 588 U1 | 2/1998 |
|---|---|---|
| DE | 199 48 926 A1 | 6/2000 |
| DE | 10 2004 017 742 A1 | 11/2005 |
| EP | 0 126 862 A1 | 12/1984 |
| EP | 0 844 415 A1 | 5/1998 |
| WO | WO 98/34040 | 8/1998 |
| WO | WO 00/63586 | 10/2000 |
| WO | WO 2005/108820 A1 | 11/2005 |

OTHER PUBLICATIONS

English language Abstract, Translated Description and Claims of WO 2005/108820 A1, European Patent Office's esp@cenet.com database, 7pp.

English language Abstract, Translated Description and Claims of DE 199 48 926 A1, European Patent Office's esp@cenet.com database, 4pp.

(Continued)

*Primary Examiner* — David Jones
(74) *Attorney, Agent, or Firm* — Smith Law Office (57) ABSTRACT

A chain link for an energy drag chain that guides conduits, tubes or the like between a stationary point of connection and a mobile point of connection. The chain link includes a cross piece and two spaced-apart link plates. The cross piece is connected to at least one link plate in an articulated manner and the connection between the cross piece and link plate can be a multi-axis connection.

9 Claims, 9 Drawing Sheets

OTHER PUBLICATIONS

PCT/IB/338, Notification of Transmittal of Translation of the International Preliminary Report on Patentability, 1p.
PCT/IB/373, International Preliminary Report on Patentability, 1p.
PCT/ISA/237, Written Opinion of the International Searching Authority, 6pp.
English language Translated Description and Claims of WO 00/63586, European Patent Office's esp@cenet.com database, 3pp.
English language Abstract, Translated Description and Claims of DE 10 2004 017 742 A1, European Patent Office's esp@cenet.com database, 4pp.
Notification of Transmittal of Translation of the International Preliminary Report on Patentability, 1p.
PCT/ISA/237, English translation of Written Opinion of the International Searching Authority, 5pp.

* cited by examiner

CHAIN LINK HAVING A MULTI-AXIS LINK JOINT

FIELD AND BACKGROUND OF THE INVENTION

The object of the invention refers to a chain link for an energy drag chain for guiding conduits, tubes or similar.

Energy drag chains are used when a mobile component, especially a component that moves essentially on a predetermined path, must be supplied with utilities, for example, power, water or similar. In such cases, conduits, tubes and similar must be guided from a stationary connecting point to a mobile connecting point in such a way that movement of the component on its predetermined movement path is made possible without its resulting in damage to the conduits.

Various embodiments of an energy drag chain are known. An energy drag chain is formed by chain links connected to one another in an articulated manner, whereby the energy drag chain is moved along a predetermined path. The chain links form a channel in which the conduits, tubes or similar are placed.

A chain link has at least one cross piece and two link plates arranged at a distance from one another. The link plates are designed so that they can be joined in an articulated manner with the link plates of a neighboring chain link. The link plates of the chain link are connected in an articulated manner through at least one cross piece. The joint between the cross piece and the link plate is hereby designed so that the cross piece is joined to at least one link plate so that the access to the lines in the guide channel or in the chain link is facilitated, and so that the insertion or removal of the conduits as well as possible access to the lines for maintenance purposes is easily possible. For this purpose, the joining of the cross piece to a link plate is separated and the cross piece is deflected to the other link plates.

In order to form separable joints between a cross piece and the link plate, several possibilities are known in the state of the art. For example, from WO 00/63586 a snap-in connection between cross piece and link plate is known which can be separated manually without the use of tools.

WO 98/34040 A1 describes an energy drag chain in which the cross piece has end sections for connecting the cross piece to the link plate, which makes swiveling of the cross piece around the swiveling axis in both end sections possible.

Moreover, from U.S. Pat. No. 4,807,432 an energy guide chain is known in which one cross piece per chain link is connected separably with the link plates. Hereby the joining of the two link plates is done with snap-in catches which are always formed on the cross pieces. Starting from this, the task of the present invention is to provide a chain link in which the swivelability of the cross piece is improved.

SUMMARY OF THE INVENTION

A chain link according to the invention for an energy drag chain for guiding conduits, tubes or similar between a stationary and a mobile connecting point has at least one cross piece and two link plates arranged at a distance to one another. The cross piece is joined to at least one link plate separably and in an articulated manner. The link joint is a multi-axial joint in the design of the chain link according to the invention.

By this design of the chain link according to the invention, the swivelability of the cross piece is improved. Due to the multi-axial articulated joint the cross piece can assume different positions within the possible swiveling action within the space. This is especially important when, in a limited space installation there is a, danger that the load on the link joint will be too high when the conduits are inserted or taken out, so that damage of a link can occur, as may be the case with the link chains according to the state of the art.

The multi-axial link joint can be achieved constructively by the fact that this is designed as a ball-and-socket joint. Such a joint facilitates an easy opening of the cross piece. On the other hand, the preferably separable ball and socket joint is designed in such a way that it can be separated with a minimum force so that a solid hold is achieved even, for example, in the case of hydraulic tubes that are introduced into the energy drag chain in order to avoid opening the chain links.

According to an advantageous embodiment of the chain link according to the invention, it is proposed that the at least one cross piece have at least one spherical head and the at least one link plate have at least one corresponding ball socket. Alternatively or additionally, the chain link can be designed in such a way that at least one link plate has at least one spherical head and the at least one cross piece has at least one corresponding ball socket.

Especially preferred is a design in which the spherical head and/or the ball socket is or are located on at least one end region of the cross piece.

The ball socket and/or the spherical head are provided on opposite end regions of the cross piece. Preferably they lie on an imaginary line that runs essentially parallel to the longitudinal axis. This is not absolutely necessary. The ball socket and/or the spherical head can also be arranged displaced with respect to one another on the opposite regions so that an imaginary connecting line intersects a longitudinal axis at an angle. Due to the offset arrangement of the spherical head and/or of a socket on the opposite-lying end regions of the cross piece, the variety of variations of positions that the cross piece can assume in the open position can increase still further. Thus, for example, the cross piece can also be swiveled essentially in the longitudinal direction of the chain link.

In order to make secure holding of the cross piece on the side link plates possible, according to a still further advantageous embodiment of the chain link, it is proposed that the link plate have a recess, which partially comprises a hand region of the cross piece. The cross piece forms a positive locking connection with at least one link plate, which can be further supported, if needed, by non-positive locking.

The chain link according to the invention preferably consists of a plastic at least partly.

The cross piece can have a width that corresponds essentially to the length of the chain link, so that the cross piece forms a cover. Further advantages and details of the chain link according to the invention will be explained with the aid of the practical examples shown in the drawing without the object of the invention being limited to these specific practical examples.

DETAILED DESCRIPTION OF THE PREFERRED EMBODIMENTS

FIGS. 1 to 10 show a first practical example of a chain link 1 according to the invention for an energy drag chain for guiding conduits, tubes and similar between a stationary and a mobile connecting point. The chain link 1 has link plates 2, 3. The link plates 2, 3 are arranged at a distance from one another. A cross piece 4 is connected to the link plates 2, 3 in a detachable and articulated manner. Each link plate 2, 3 has a joint bolt on one end region. In the opposite end region of each link plate 2, 3 an articulated receptacle 6 is formed in each case. The joint bolts 5 and the articulated receptacle 6 are designed so that the chain links can be connected together in an articulated manner.

Figure 2:
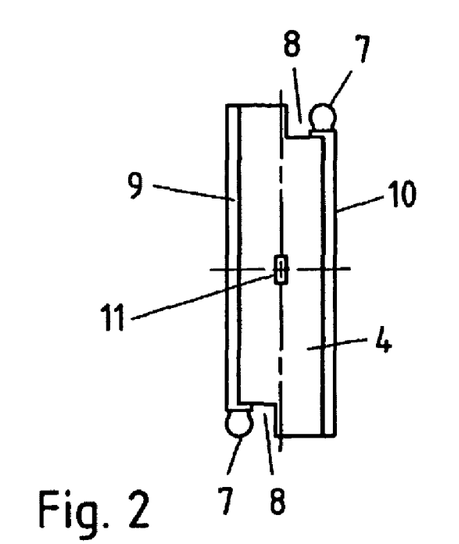
FIG. 2 is a cross piece of the chain link depicted in FIG. 1.

The cross piece 4 has a spherical head 7 on each of the opposite end regions. In the practical example shown, the spherical heads 7 are arranged diametrally opposite to one another. A gap 8 is formed between the spherical head 7 and the neighboring region of the cross piece. The longitudinal edges 9, 10 of the cross piece 4 are rounded, as can be seen for example from FIG. 7 or 8.

On the top side of cross piece 4 a tool application area 11 is formed. This tool application area is held in a slit shape in the practical example shown, so that, for example, a screwdriver can be inserted into this tool application region 11.

Figure 3:
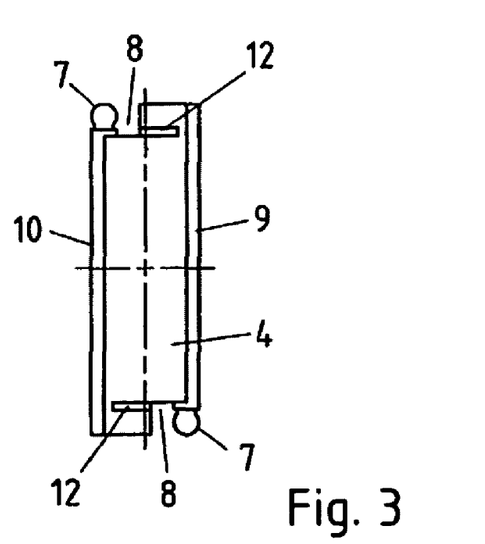
FIG. 3 is a bottom view of the cross piece.

On the bottom side of cross piece 4, in the particular end region a slit 12 is always provided, which extends essentially perpendicular to the longitudinal direction of the cross piece 4.

Figure 1:
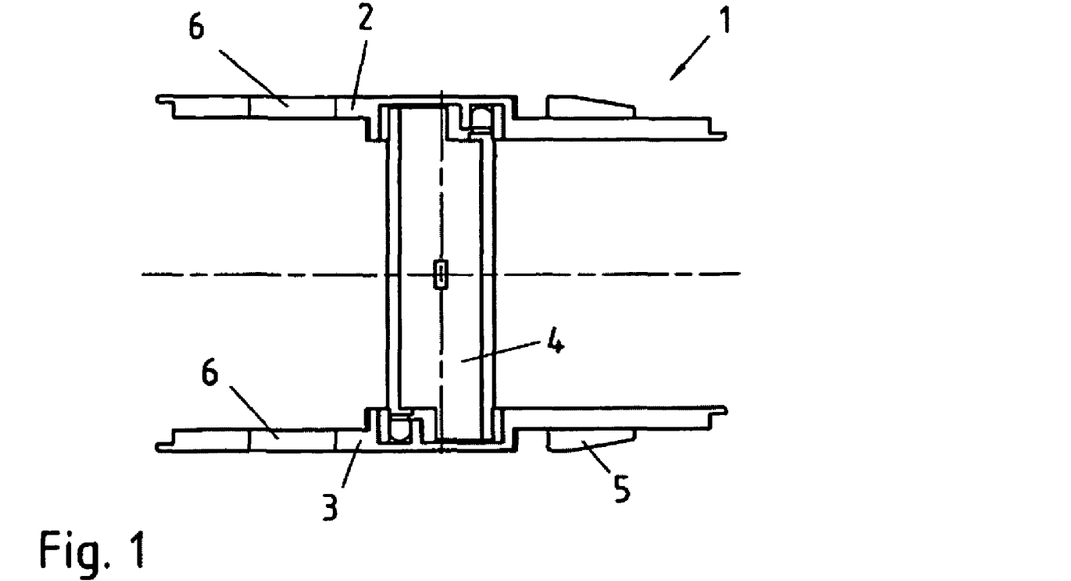
FIG. 1 is a top view of a chain link in accordance with the present invention.
Figure 4:
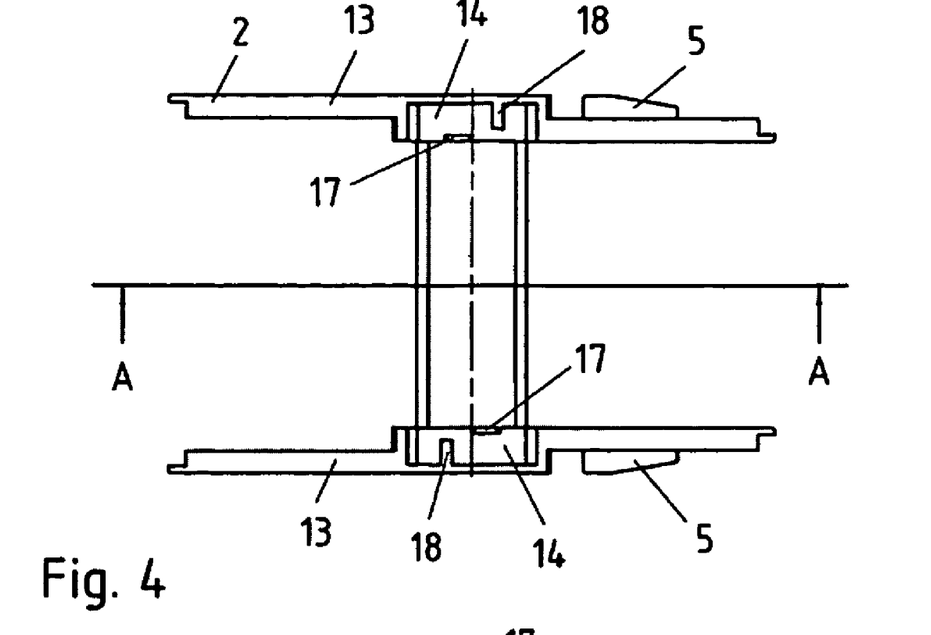
FIG. 4 is the chain link of FIG. 1 without a cross piece.
Figure 5:
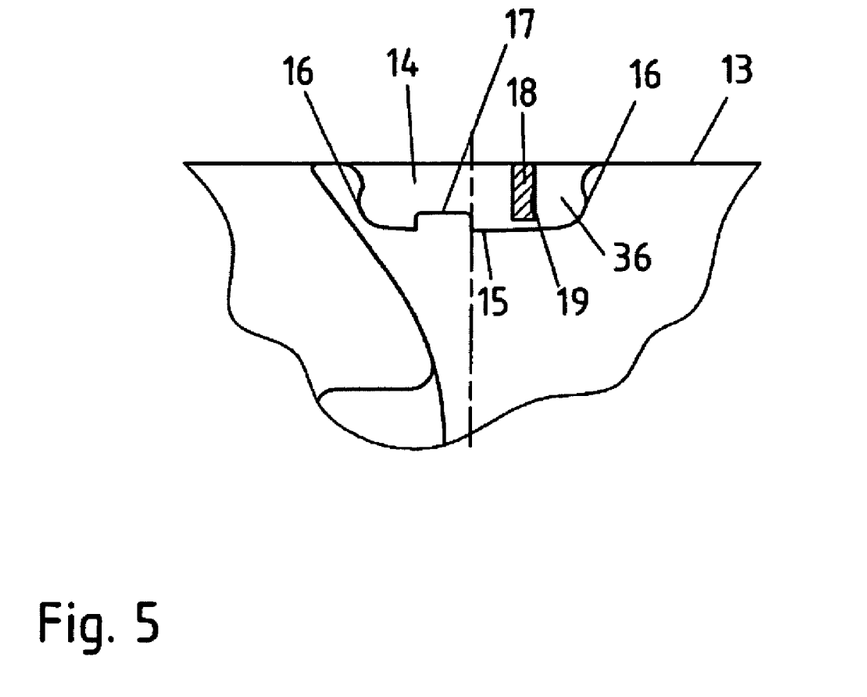
FIG. 5 is a cross-section of the chain link in a view along A-A according to FIG. 4.

FIGS. 4 and 5 show the chain link according to FIG. 1 but without the cross piece 4. Each link plate 2, 3 has a longitudinal edge 13. In the longitudinal edge 13 and in the direction of the opposite longitudinal edge of a link plate, a recess 14 is formed which serves for accepting an end region of the cross piece 4. The recess 14 has a bottom 15 and side walls 16. A projection 17 is formed starting from the bottom 15 and essentially orthogonally to it. The projection 17 is formed and arranged in such a way that it penetrates into the slit 12 of cross piece 4 when the cross piece 4 is connected to the link plates 2, 3. The pairing of projection 17 and slit 12 is preferably designed so that these at least partially absorb the forces that occur perpendicular to the longitudinal direction of the chain link, so that a transverse securing of the chain link is achieved.

The side walls 16 have a contour that is adjusted to the longitudinal edges 9, 10 of the cross piece 4. Preferably, the longitudinal edges 9, 10 are rounded so that their radius of curvature corresponds essentially to the radius of the spherical head 7. In order to make possible the removal of the cross piece from the recess 14 by applying only a certain predetermined force, the side walls 16 are provided with a back cut so that minimum force is necessary in order to detach the cross piece 4 from the link plates 2, 3.

It can be seen from the representation according to FIGS. 4 and 5 that in the region of the recess 14 a tongue 18 is provided, which is arranged between the side walls 16 and at a distance to bottom 15, so that the tongue 18 has a certain elasticity. The distance of the tongue 18 to the side wall 16 is chosen so that the spherical head 7 can be introduced into this intermediate space, so that the spherical head 7 lies against side wall 16 and the tongue 18. In the practical example shown, the tongue 18 has a round cap 19 into which the spherical head 7 partially penetrates. The tongue 18 and the neighboring side wall 16 form a socket 36. In order to introduce the spherical head between the tongue 18 and the side wall 16, a certain force is required, with the aid of which the tongue 18 is deflected until the spherical head 7 reaches the round cap 19. A positive or non-positive locking may be formed between the spherical head 7 and the tongue 18 and the side wall 16.

Figure 6:
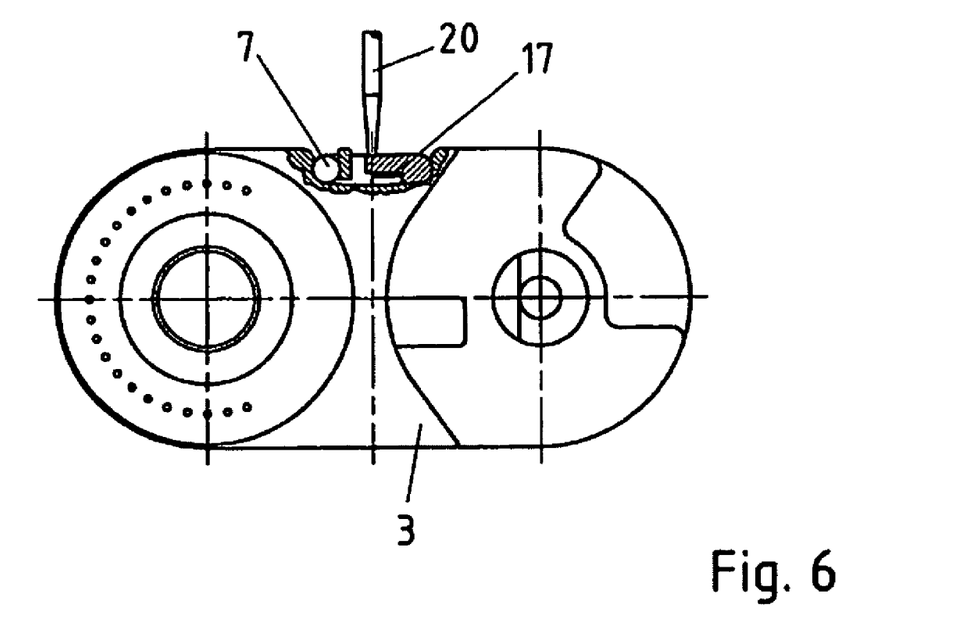
FIG. 6 shows an opening process for detaching the cross piece.
Figure 7:
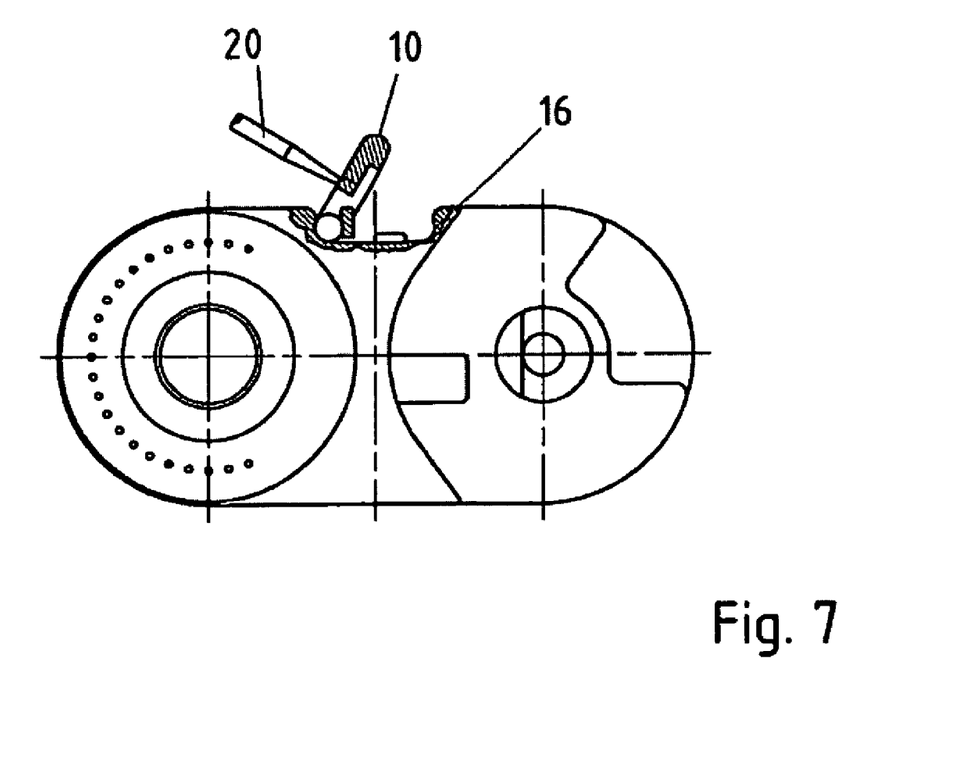
FIG. 7 shows an opening process for detaching the cross piece.
Figure 8:
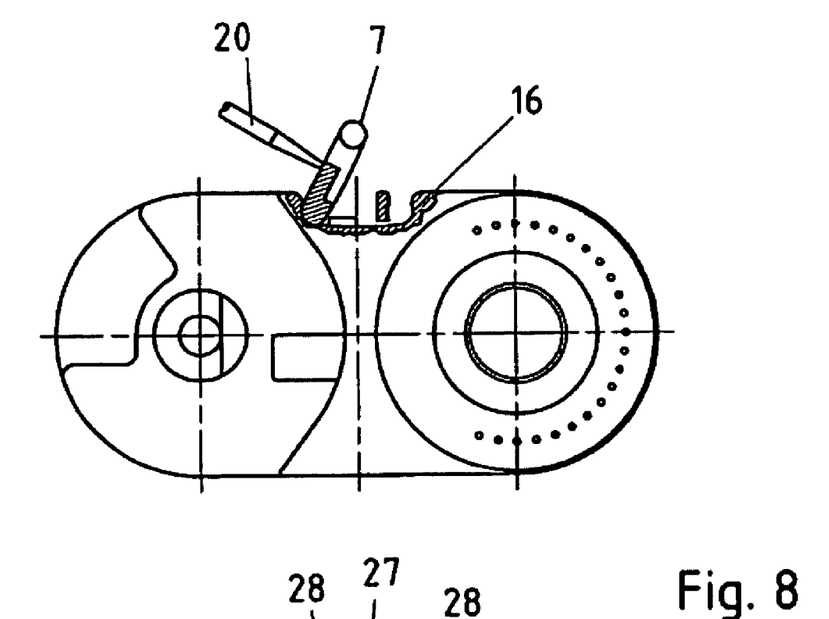
FIG. 8 shows an opening process for detaching the cross piece.

In order to detach the cross piece 4 from the link plates 2, 3, a tool 20 is introduced into the tool application region 11 of the cross piece 4, as can be seen from FIG. 6, 7 or 8. By swiveling the tool, a certain torque is exerted on the cross piece, which is sufficiently high to achieve the detachment of the cross piece 4 from the recess 14. It can be seen from FIGS. 6 and 7 that the cross piece is separated from the link plate 3 by the rotation of the longitudinal edge 10 out through the back cut in the side wall 16.

The construction of the chain link and the design of the recesses and the cross pieces are chosen in such a way that, independently of whether the tool 20 is rotated in the clockwise or counter-clockwise direction, the cross piece 4 can be pivoted out from the recess 14.

Figure 9:
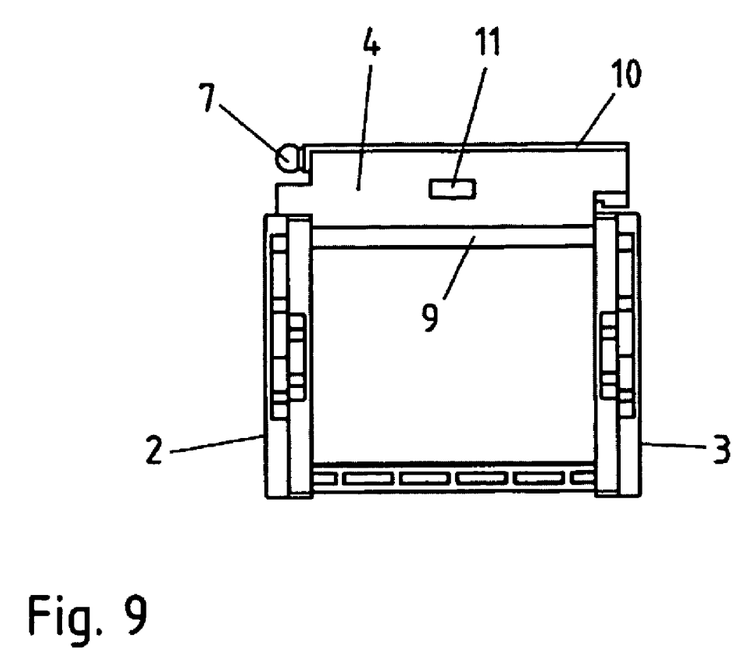
FIG. 9 is an end view of a chain link with partially opened cross piece.

FIG. 9 shows the cross piece 4 in a partially detached state and swiveled, whereby one of the spherical heads is still secured in the recess. The side wall 16 and the tongue 18 form a socket in which the spherical head 7 is supported so that a multi-axial swivelability of the cross piece 4 is made possible, as can be seen from FIG. 10.

Figure 10:
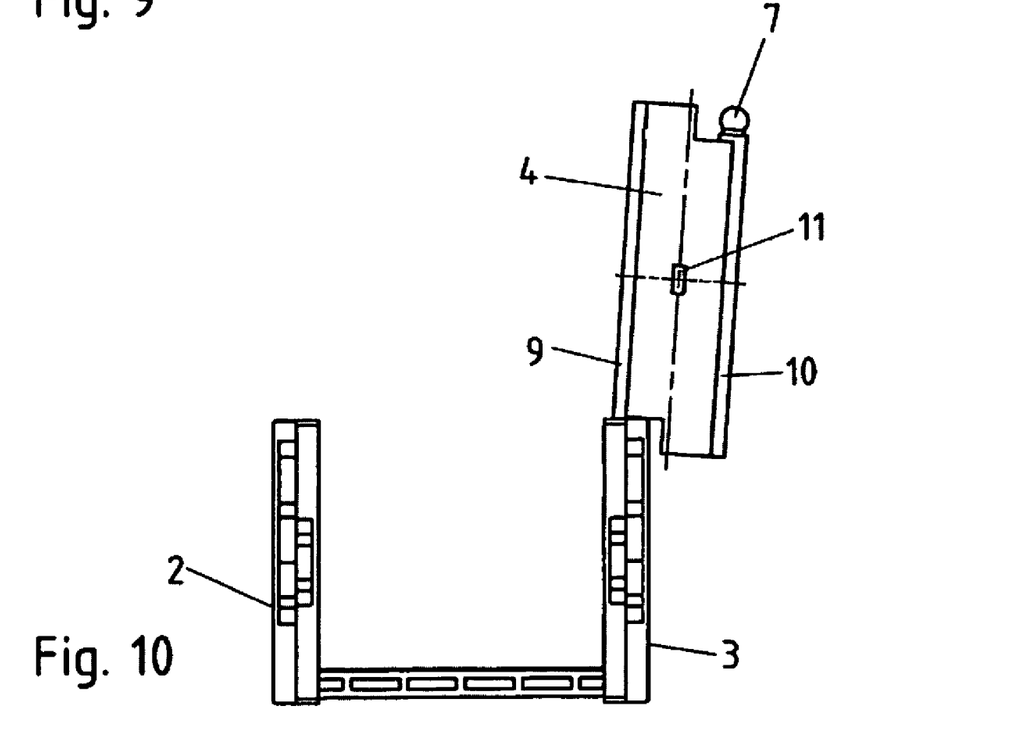
FIG. 10 is an end view of a chain link with completely opened cross piece.

If a force is exerted on the cross piece 4 in the open state, then, under certain circumstances, this leads to complete detachment of the cross piece from the link plate 3 without the link plate and/or the cross piece being partially destroyed, as is the case occasionally with the known chain links.

Figure 11:
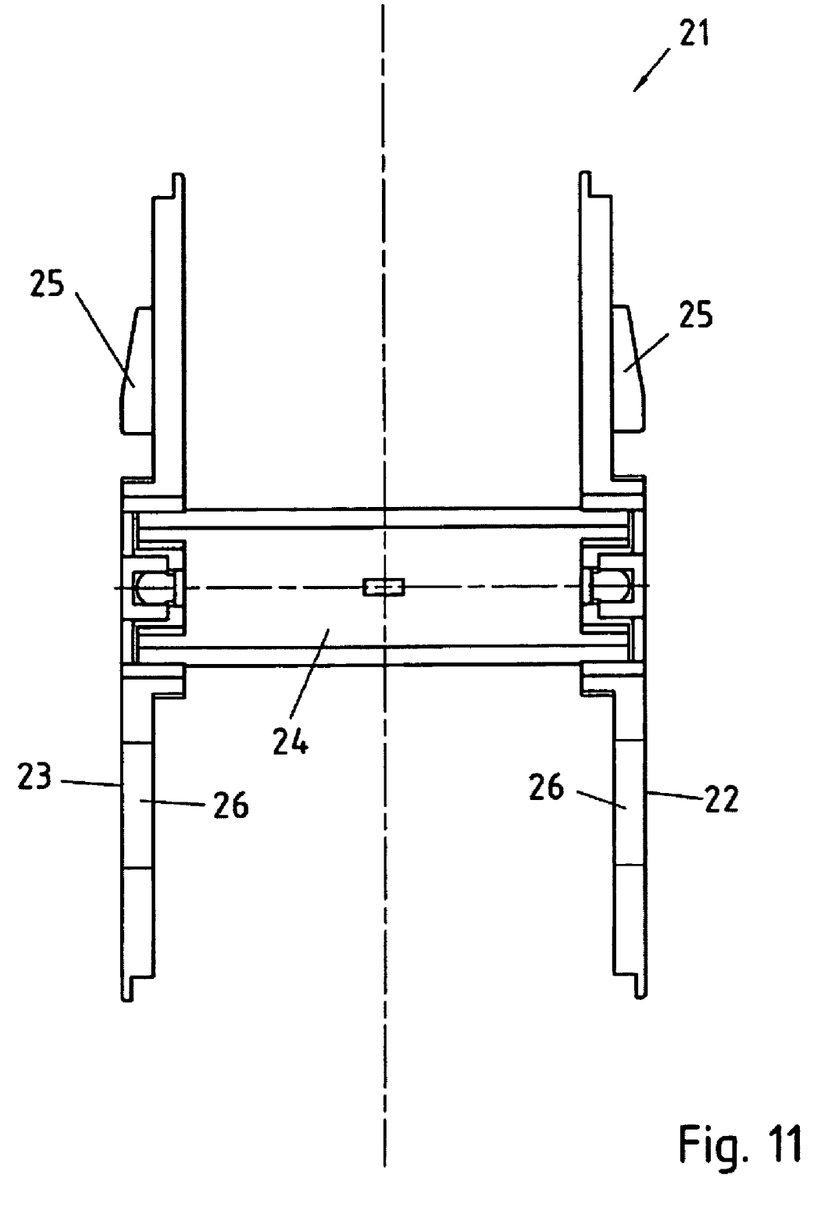
FIG. 11 is a top view of an alternate embodiment of a chain link in accordance with the present invention.
Figure 12:
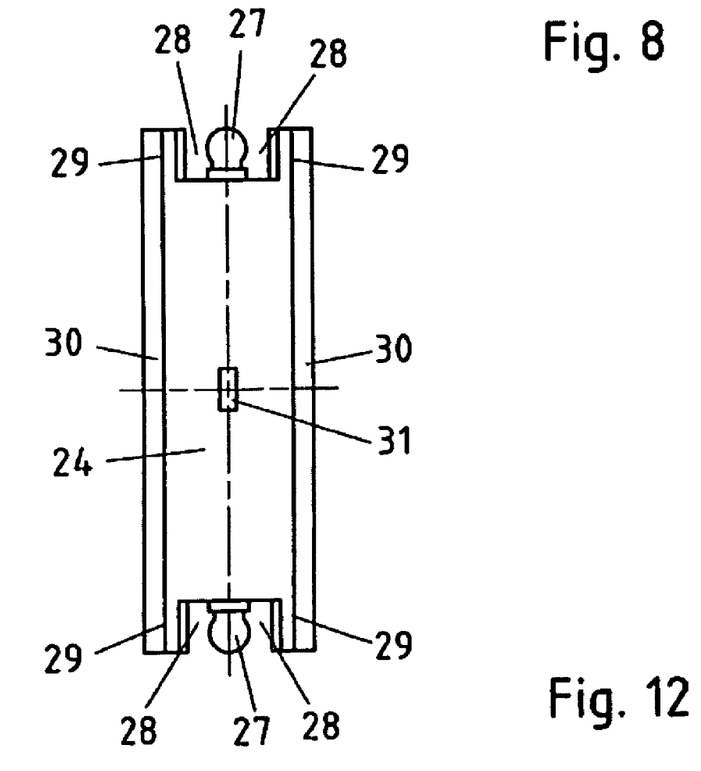
FIG. 12 is a top view of cross piece of the chain link according to FIG. 11.
Figure 13:
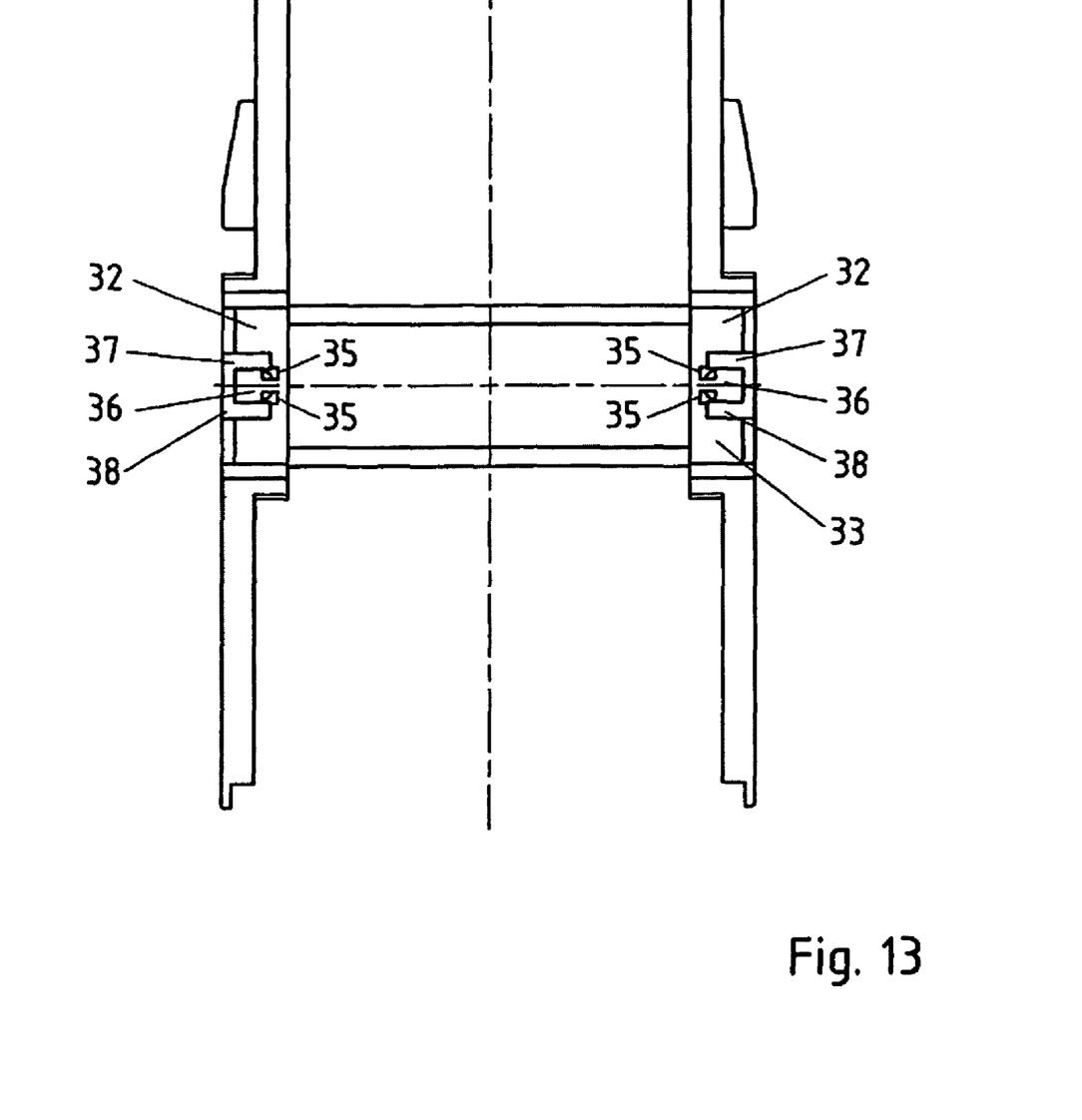
FIG. 13 is a top view of the chain link according to FIG. 11, but without cross piece.

FIGS. 11 to 16 show a second embodiment of a chain link for an energy drag chain according to the invention for the guidance of conduits, tubes or similar between a stationary and a mobile connection. The chain link 21, as is shown in FIG. 11, has a link plate 22 and a second link plate 23. Each link plate 22, 23 has, in the practical example shown, a joint bolt 25, which can be introduced into a corresponding articulated receptacle 26 of a neighboring chain link. The link plates 22, 23 are arranged at a distance from one another and joined to one another by a cross piece 24. The cross piece 24 is shown in FIG. 12. This has a spherical head 27 at each of its end regions. The cross piece 24 is designed to be symmetrical with respect to a transverse axis. A gap 28 is provided on both sides of the spherical head, and this is delineated by the spherical head 27 and extensions 29 of the longitudinal edges 30 of the cross piece 24. The longitudinal edges 30 are preferably designed to be rounded. A tool application region 31 is formed in the central region of the cross piece 24, provided to hold a tool, for example a screwdriver.

Figure 14:
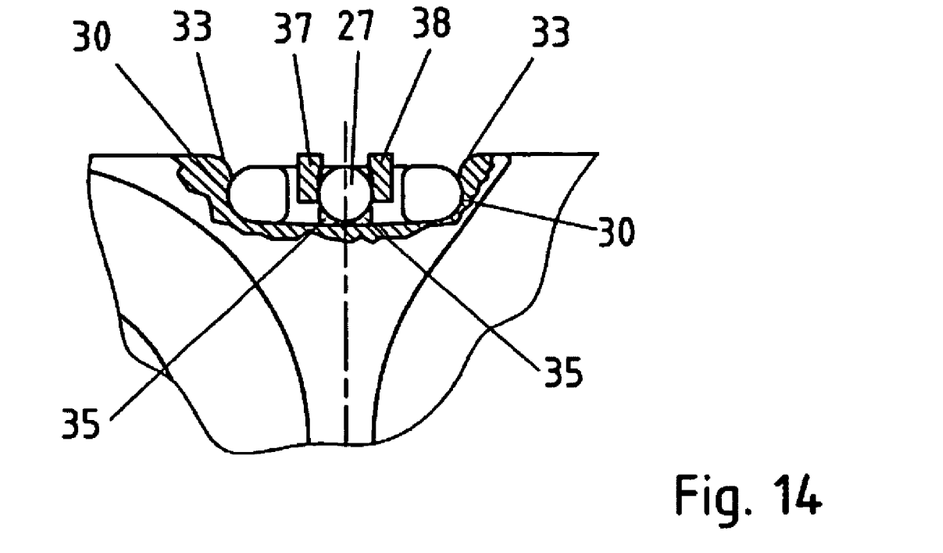
FIG. 14 is a side view and partial cross-section of the chain link according to FIG. 11.
Figure 15:
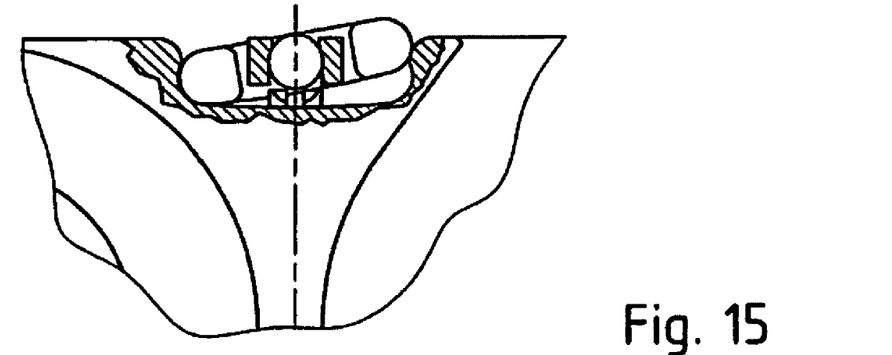
FIG. 15 is a partial cross-section of the chain link according to FIG. 11 with partially-detached cross piece.
Figure 16:
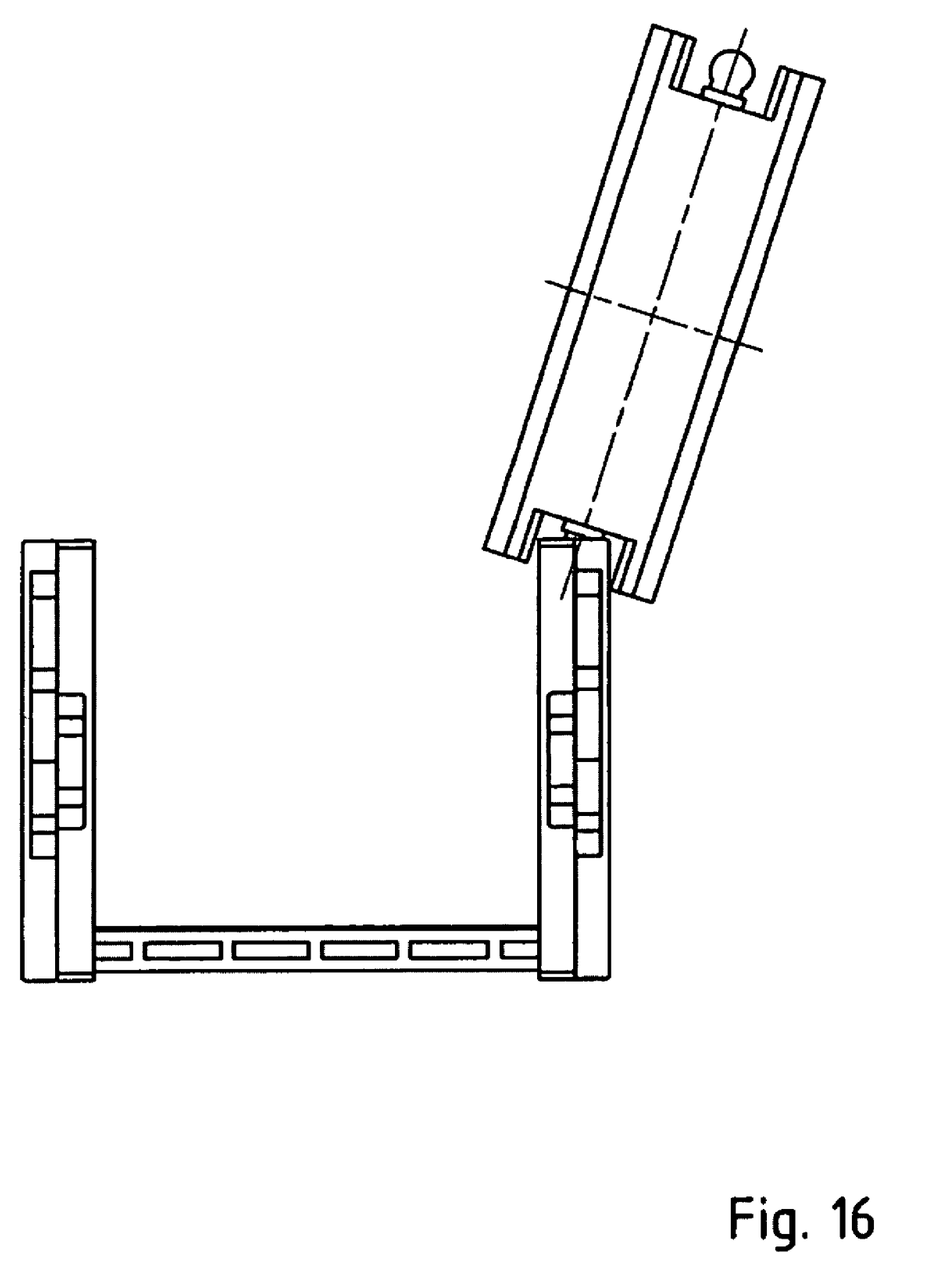
FIG. 16 is the front view of the chain link according to FIG. 11 with an opened cross piece.

FIG. 14 shows the chain link according to FIG. 11 but without the cross piece 24. It can be seen from the representation in FIG. 13 that each link plate 22, 23 has a recess 32 for accepting the particular end region of the cross piece 24. The recess 32 is delineated by its side walls 33 and a bottom wall 34. From the bottom wall 34, over a part of the depth of the recess 32, elevations 35 rise against which a spherical head 27 can be brought to rest. A socket 36 is delineated by the projections 37, 38. FIG. 14 shows a link plate 22 with a cross piece 24 in partial section. It can be seen from this representation that the side walls 33 are designed with back cuts that partially surround the longitudinal edges 30 of the cross piece 24. The spherical head 27 is arranged between the projections 37, 38. It lies on the elevations 35. The elevations 35 engage behind the articulated head 27, so that the elevations 35 with the projections 37, 38 provide insurance against detachment of the cross piece transverse to the longitudinal direction of the chain link. The projections 37, 38 have socket-shaped recesses arranged above one another, which are adjusted to the shape of the spherical head 27. In order to detach the cross piece 24 from the link plates, a tool is introduced into the tool entry region 21 and a torque is applied to the cross piece so that the cross piece is rotated partially out of the socket 32. During this process, the spherical head 27 enters the socket as can be seen in FIG. 15. The cross piece 24 can then be swiveled corresponding to the swiveling angle of the pair of socket/ball, for example into a position as represented in FIG. 16.

The invention claimed is:

1. A chain link for an energy drag chain that extends between a stationary connection point and a mobile connection point, the chain link comprising:
   a cross piece having a substantially spherical head; and
   two link plates arranged at a distance from one another, and at least one of the link plates includes a socket for receiving the substantially spherical head to join the cross piece and the link plate at a multi-axial articulated joint without a threaded connection portion.

2. The chain link according to claim 1, wherein the cross piece comprises:
   a first end region, and the first end region includes the substantially spherical head arranged on an axis that intersects a longitudinal axis of the cross piece, and the substantially spherical head is at least a portion of the multi-axial articulated joint.

3. The chain link according to claim 1, wherein the socket is at least a portion of the multi-axial articulated joint.

4. The chain link according to claim 1, wherein at least one link plate is made at least partially from plastic.

5. The chain link according to claim 1, wherein the cross piece is disposed to form a cover over a space between the two link plates.

6. A chain link for an energy drag chain that extends between a stationary connection point and a mobile connection point, the chain link comprising:
   a cross piece having a socket; and
   two link plates arranged at a distance from one another, and at least one of the link plates includes a substantially spherical head for engaging the socket to join the cross piece and the link plate at a multi-axial articulated joint.

7. The chain link according to claim 6, wherein the cross piece comprises:
   an end region defining the socket that is at least a portion of the multi-axial articulated joint.

8. The chain link according to claim 6, wherein the cross piece comprises:
   a first end region, and the first end region includes the socket to define an axis arranged substantially parallel to a longitudinal axis of the cross piece, and the socket is at least a portion of the multi-axial articulated joint.

9. The chain link according to claim 6, wherein the cross piece comprises:
   an end region defining the socket, and the socket is substantially spherical to define at least a portion of the multi-axial articulated joint.

* * * * *